United States Patent
Babaian et al.

(10) Patent No.: US 6,820,255 B2
(45) Date of Patent: Nov. 16, 2004

(54) METHOD FOR FAST EXECUTION OF TRANSLATED BINARY CODE UTILIZING DATABASE CACHE FOR LOW-LEVEL CODE CORRESPONDENCE

(75) Inventors: Boris A. Babaian, Moscow (RU); Andrew V. Yakushev, Sergiev-Posad (RU); Roman A. Khvatov, Khimky (RU); Sergey Y. Petrovsky, Moscow (RU)

(73) Assignee: Elbrus International, Grand Cayman (KY)

(*) Notice: Subject to any disclaimer, the term of this patent is extended or adjusted under 35 U.S.C. 154(b) by 609 days.

(21) Appl. No.: 09/838,532

(22) Filed: Apr. 18, 2001

(65) Prior Publication Data

US 2002/0059268 A1 May 16, 2002

Related U.S. Application Data

(63) Continuation-in-part of application No. 09/505,652, filed on Feb. 17, 2000.
(60) Provisional application No. 60/120,348, filed on Feb. 17, 1999, provisional application No. 60/120,376, filed on Feb. 17, 1999, provisional application No. 60/120,380, filed on Feb. 17, 1999, provisional application No. 60/120,457, filed on Feb. 17, 1999, provisional application No. 60/120,458, filed on Feb. 17, 1999, provisional application No. 60/120,459, filed on Feb. 17, 1999, and provisional application No. 60/120,504, filed on Feb. 17, 1999.

(51) Int. Cl.$^7$ .............................................. G06F 9/45
(52) U.S. Cl. ..................... 717/151; 717/136; 717/139; 717/148; 717/140; 711/4; 711/5
(58) Field of Search ............................... 717/136–140, 717/148, 153, 151, 149, 147; 703/26–27; 711/4, 5, 100

(56) References Cited

U.S. PATENT DOCUMENTS

| | | | | |
|---|---|---|---|---|
| 4,667,290 A | * | 5/1987 | Goss et al. ................. | 717/147 |
| 5,577,231 A | * | 11/1996 | Scalzi et al. .................. | 703/26 |
| 5,590,331 A | * | 12/1996 | Lewis et al. ................. | 717/144 |
| 5,768,593 A | * | 6/1998 | Walters et al. ............... | 717/141 |
| 5,805,895 A | * | 9/1998 | Breternitz et al. ........... | 717/160 |
| 5,835,768 A | * | 11/1998 | Miller et al. ................. | 719/320 |
| 5,930,509 A | | 7/1999 | Yates et al. | |
| 5,958,061 A | | 9/1999 | Kelly et al. | |
| 6,044,220 A | * | 3/2000 | Breternitz, Jr. ............. | 717/139 |
| 6,070,160 A | * | 5/2000 | Geary .......................... | 707/4 |
| 6,091,896 A | * | 7/2000 | Curreri et al. ............... | 717/125 |
| 6,105,124 A | * | 8/2000 | Farber et al. ................ | 712/208 |

(List continued on next page.)

OTHER PUBLICATIONS

TITLE: The Structure and Performance of Interpreters, author: Romer et al, ACM, 1996.*

(List continued on next page.)

*Primary Examiner*—Chameli C. Das
(74) *Attorney, Agent, or Firm*—Townsend and Townsend and Crew LLP

(57) ABSTRACT

The present invention increases efficiency of a binary translation process by correlating selected foreign code to previously translated binary host code. This approach eliminates repetitive translation of foreign code when the foreign code is executed on a host computer system. During the translation process, a database of translated foreign code is populated and thereafter a software layer checks for correspondence between the foreign code and binary code stored in the database. If the database contains corresponding code, that code is transferred to system memory for execution and there is no need to retranslate the foreign code. Minimizing the time spent translating the foreign code results in improved execution speed on the host computer system. The software layer creates an index into the database by hashing the foreign code or by using the storage location of the foreign code. By way of example, the sector of a disk drive where the foreign code is stored determines the index into the database.

8 Claims, 5 Drawing Sheets

U.S. PATENT DOCUMENTS

| | | | | |
|---|---|---|---|---|
| 6,145,121 A | * | 11/2000 | Levy et al. ................ | 717/135 |
| 6,397,379 B1 | * | 5/2002 | Yates et al. ................ | 717/140 |
| 6,405,187 B1 | * | 6/2002 | Egan et al. .................... | 707/2 |
| 6,535,903 B2 | * | 3/2003 | Yates et al. ................ | 718/100 |
| 6,631,514 B1 | * | 10/2003 | Le ............................ | 717/137 |
| 6,701,520 B1 | * | 3/2004 | Santosuosso et al. ....... | 717/152 |

OTHER PUBLICATIONS

TITLE: CRL: High Performance All–Software Distributed Shared Memory, author: Johnson et al, ACM, 1995.*

Sites, Richard L., et al., "Binary Translation," Communications of the ACM, Feb. 1993, vol. 36, No. 2, pp. 69–81.

Dobberpuhl, Daniel, et al., "Design of EV–4," Communications of the ACM, Feb. 1993, vol. 36, No. 2, p. 82. (one–page—stapled to back of Cite AD above).

Diefendorff, Keith, "The Russians are Coming—Supercomputer Maker Elbrus Seeks to Join x 86/1A–64 Melee," Microprocessor Report, Feb. 15, 1999, vol. 13, No. 2, pp. 1–7.

Silberman, Gabriel M., et al., "An Architectural Framework for Supporting Heterogeneous Instruction–Set Architectures," Computer, Jun. 1993, vol. 26, No. 6, pp. 39–56.

Rivest, Ronald L., "The MD5 Message–Digest Algorithm," Memo, Network Working Group, MIT Laboratory for Computer Science and RSA Data Security, Inc., Apr. 1992, 21 pages.

* cited by examiner

METHOD FOR FAST EXECUTION OF TRANSLATED BINARY CODE UTILIZING DATABASE CACHE FOR LOW-LEVEL CODE CORRESPONDENCE

This Continuation-in-part application claims priority from co-pending U.S. patent application Ser. No. 09/505,652, filed Feb. 17, 2000, entitled "System for Improving Translation of Software from a Native Computer Platform to a Target Computer Platform," which is a non-provisional of U.S. Provisional Patent Application Nos. 60/120,348, 60/120,376, 60/120,380, 60/120,457, 60/120,458, 60/120,459, and 60/120,504, all filed Feb. 17, 1999; each of which is incorporated herein by reference as if set forth in fall in this document.

CROSS-REFERENCES TO RELATED APPLICATIONS

This Continuation-in-part application is related to co-pending U.S. patent application Ser. No. 09/838,552, filed Apr. 18, 2001, entitled "Method and Apparatus for Preserving Precise Exceptions in Binary Translated Code;" U.S. patent application Ser. No. 09/838,530, filed Apr. 18, 2001, entitled "Method For Emulating Hardware Features Of A Foreign Architecture In A Host Operating System Environment;" and U.S. patent application Ser. No. 09/838,550, filed Apr. 18, 2001, entitled "Method for Effective Binary Translation Between Different Instruction Sets Using Emulated Supervisor Flag and Multiple Page Tables" each of which is incorporated herein by reference as if set forth in fall in this document.

BACKGROUND OF THE INVENTION

There are a wide variety of commercially available microprocessors (often referred to as "processors") that a system designer may select for a particular application. Many of these processors are based on different design philosophies such as reduced instruction set computing (RISC) versus complex instruction set computing (CISC) and on different length of an instruction word (32-bit versus 64-bit versus 128-bit). In addition to different design philosophies manifested by the instruction set, various other architectural differences may be found in various processors. For example, some processors may execute instructions in parallel while others do not. Other processors may use shared memory while others do not. Although there are a number of commercially processors based on competing and often incompatible architecture, the well-known x86 architecture is currently a popular architecture for which a tremendous amount of computer software has been developed. However, because of the necessity to maintain backward compatibility with less powerful processors, the x86 suffers from a lack of performance when compared to processors based on different architectures not constrained by the need to run legacy software and maintain backward compatibility.

When legacy (or base) software is designed, it is typically written for a particular processor and computer system based on a particular architecture. And while it is possible to port foreign software to a new, but more advanced, architecture, it is a difficult task that requires a complete understanding of both the legacy architecture and the new architecture. Further, there are times where the source code, the human readable version of the foreign software, is not available. In such instances, it is often very difficult to accurately recreate the original functions of the software on the new architecture. This difficulty arises because of the various nuances the foreign software often incorporates to take advantage of the features of the legacy architecture.

Clearly, it is useful to automate the translation of foreign software originally developed for a legacy architecture to a computer system, or processing "platform," having an architecture that is different from that for which the software was originally designed. Translation allows foreign software to execute on computer systems other than the one it was originally written and therefore increases the commercial value of the software. Further, translation can extend the life of the software past the life of the computer system for which it was originally designed. Clearly, it would be desirable if the translation process were automated to reduce, or eliminate, the cost to port foreign software to another architecture.

The process of translating software from a foreign architecture to a native architecture is often referred to in the art as binary translation and various binary translation techniques are well known in the art. In general, binary translation converts binary foreign code, that is legacy software originally written and compiled for a specific architecture, to host code capable of being executed by a processor and computer system that is based on a different architecture. More specifically, binary compilation is the process of detecting each instruction and converting these instructions to one or more equivalent native operations. While it is often impossible to achieve a one-to-one translation of each instruction due to architectural differences, the translation process is especially difficult where the data constructs and memory addressing schemes differ between the foreign and native or target architectural platforms and where the source code is not available. Accordingly, it is often necessary to analyze binary foreign code (rather than source code) to determine the most efficient equivalent instruction or instructions for achieving the same result when executed on the new architecture. This analysis and translation process is typically slow and labor intensive. Accordingly, any reduction of the need for the analysis and compilation not only has an important bearing on binary code performance but also on the cost to port the code to the native platform.

By its very nature, software tends to be complex and must execute with a virtually a zero tolerance for errors. Unfortunately, certain areas of software translation are extremely difficult. Typically, these involve specialized instructions that deal with hardware components, high-performance instructions, addressing modes, input/output and other aspects that are closely tied to the hardware developed for the legacy architecture.

In some prior art binary compilation schemes, the target platform typically includes a foreign engine adapted to execute foreign code instructions and a native engine designed to execute translated binary code (host code). This type of scheme translates certain foreign instructions during the compile process into a corresponding set of native binary code while other foreign instructions are typically not translatable. Where it is not possible to readily translate foreign code into host code, the target platform must be able to switch between the foreign engine and the native engine during run-time execution. Since, translated binary code needs to run as fast or faster on the target platform than the foreign code did on the foreign platform, it is often unacceptable to constantly switch between the two engines during run-time. For this reason, it is desirable to more fully translate the binary foreign code to host code prior to run-time.

Thus, it is desirable to provide a method that achieves efficient and accurate translation of software so that it can be executed to operate on a variety of computer platforms without the need of expensive manual translation. Further, it is desirable to provide a method that achieves efficient and accurate translation of software so that it can be executed on a variety of computer platforms without have to switch between a foreign engine and a native engine.

SUMMARY OF THE INVENTION

The present invention relates to a method for efficiently executing translated binary code on a computer platform. More specifically, the present invention relates to a method that reduces the time for analysis and compilation of foreign code to host code. The method uses low-level code correspondence checking during binary runtime translation process. Advantageously, the method does not require obvious translation of foreign code into host code.

The present invention improves the efficiency of the binary translation process by correlating previously translated binary host code to foreign code. This approach eliminates the repetitive process of translating the same foreign code more than once. In this approach, the translation process builds a database of translated foreign code that a software layer checks for correspondence whenever the foreign code is subsequently accessed. The database of binary code is preferably stored on a hard disk.

In one preferred embodiment, as each sequence of foreign code (that is an instruction or a group of instructions) is acquired from secondary storage, correspondence is determined between the foreign code and the cache of host code. If corresponding host code is included in the database, it is transferred to system memory for execution. If the host code in the database does not include corresponding translated binary code then a translation process, which uses various compilation techniques, is invoked to translate the foreign code to host code. Newly compiled code is then added to the database so that it may be subsequently accessed should the need arise. Thus, the present invention eliminates the slow and repetitive process of translating the same foreign code more than once. In this manner, the host system may execute translated binary code in the native environment and achieve comparable or better performance than the foreign code executing on the foreign system.

To further improve efficiency, the present invention also maintains the database so performance is not decreased. Thus, if a portion of the code in the database is not frequently accessed, it can be removed from the database or moved to an archival database. Further, if a portion of the code has not been accessed within a selected period of time, it can be removed from the database. If the removed portion of code is subsequently required, it will then simply be re-translated.

As will be appreciated by one skilled in the art, most operating system and application programs are initially stored in a secondary storage device such as a disk drive. When a user selects the program for execution, the program's code is transferred from the disk drive to faster system-level memory. For larger application programs or operating systems, only a portion of the code may be transferred to memory as required by the particular task to be performed. Indeed, it is common for repeated disk accesses to transfer code from disk to system memory as the program performs a plurality of tasks. Each time the program swaps code out of a portion of memory and replaces it with new code, the host computer system must make sure that the proper host code is executed. During these transfer operations, the present invention solves the problem of how to rapidly translate foreign code into host code without degrading program performance.

DESCRIPTION OF THE SPECIFIC EMBODIMENTS

Figure 1:
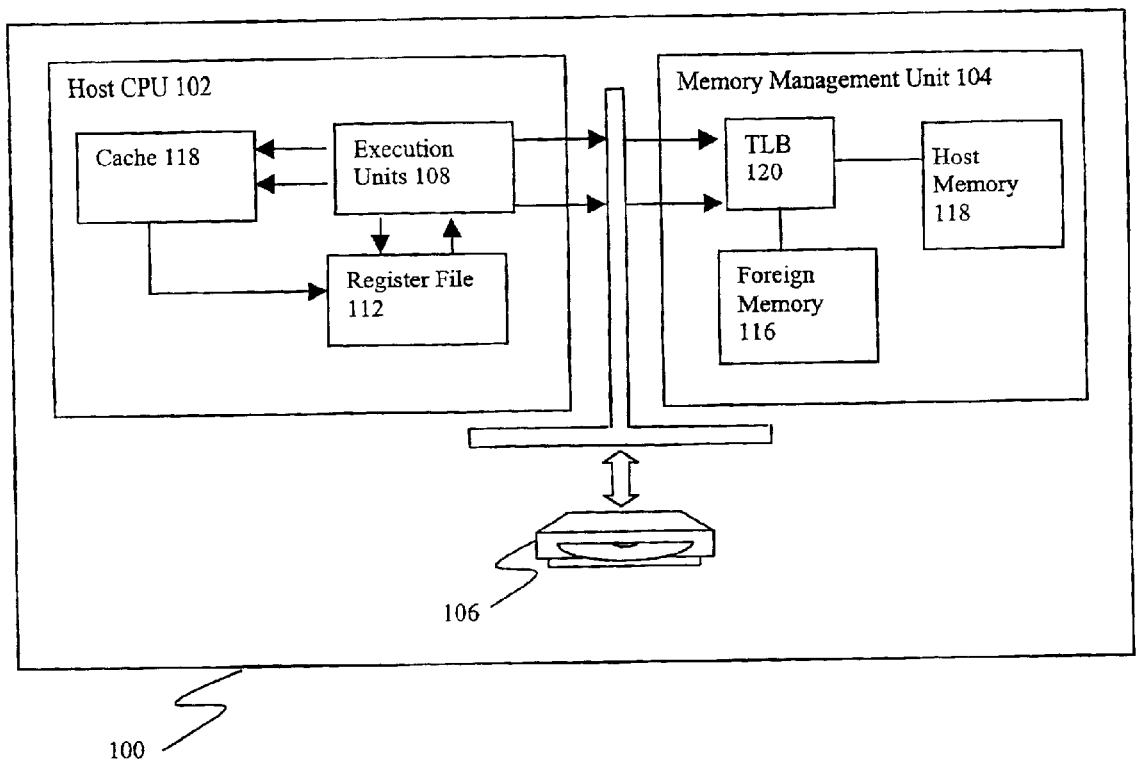
FIG. 1 illustrates a representative embodiment of a host computer system.

The present invention relates to an apparatus and method for executing foreign binary code on a host computer. More particularly, the present invention relates to an improved apparatus and method for efficiently executing foreign code on a host system in real time. In the following description of preferred embodiments, reference is made to the accompanying drawings that form a part hereof, and in which is shown by way of illustration a specific embodiment in which the invention may be practiced. It is to be understood that other embodiments may be utilized and that changes may be made without departing from the scope of the present invention. For purposes of illustration, the following description describes the present invention as used with computer systems based, in general, on a RISC-based processor. However, it is contemplated that the present invention can also be used as a part of computer systems having multiple such processors or having CISC-based processors or processors based on explicit instruction level parallelism. It will also be apparent to one skilled in the art that the present invention may be practiced without the specific details disclosed herein. In other instances, well-known structures and techniques associated with the described processor or computer system have not been shown or discussed in detail to avoid unnecessarily obscuring the present invention. Reference will now be made in detail to the preferred embodiments of the invention, examples of which are illustrated in the accompanying drawings. Wherever possible, the same reference numbers will be used throughout in the drawings to refer to the same or like components.

Referring now to FIG. 1, a host computer system 100 is illustrated. Host computer system 100 comprises a computer processing unit (CPU) 102, a memory management unit (MMU) 104 and a storage device such as disk drive 106. Host CPU 102 comprises one or more execution units 108 and a cache 110. Execution units 108 include logic to input and retrieve address pairs from cache 110 to facilitate the execution of translated binary code. When translating foreign code, execution units 108 input a foreign address to the cache and retrieve a corresponding host address for use during execution of translated binary code. The CPU 102 also includes a register file 112. MMU 104 includes logic to form in system memory a foreign virtual memory space 116 and a host virtual memory space 118. The MMU 104 also includes a translation lookaside buffer (TLB) 120 designed to provide coherence between foreign code in foreign virtual memory 116 and translated binary code in host virtual memory 118. Any access of foreign virtual memory is handled by TLB 120. The dual virtual memory spaces 116 and 118 are used to maintain the content of the foreign virtual memory in a state consistent with the foreign architecture during execution of the foreign code.

In accordance with the present invention, host computer system 100 translates foreign binary code at run-time. As used herein, foreign binary code means computer instructions written for a foreign processing system but ported to host computer system 100. A foreign processing system may, by way of example, be a computer processing system based on an Intel x86 processor, a Motorola 68xxx processor or a Sun Sparc processor. Compounding the difficulties of executing foreign code on the host is the differences in architecture between the host computer system 100 and the foreign system.

In order to execute foreign code, host computer system 100 must first translate foreign binary code to equivalent host code. The translation process rebuilds foreign binary code using a host translator so that the translated binary program provides a sequence of host instructions that reproduce the behavior of the foreign program on the foreign architecture.

To minimize performance penalties associated with executing translated binary code, host CPU 102 maintains the same data representation and processing as the foreign architecture using host registers 112. The host computer system 100 has certain foreign architecture independent features and some platform specific features to minimize performance degradation. All of the foreign hardware features that do not influence performance are preferably implemented in software.

Figure 2:
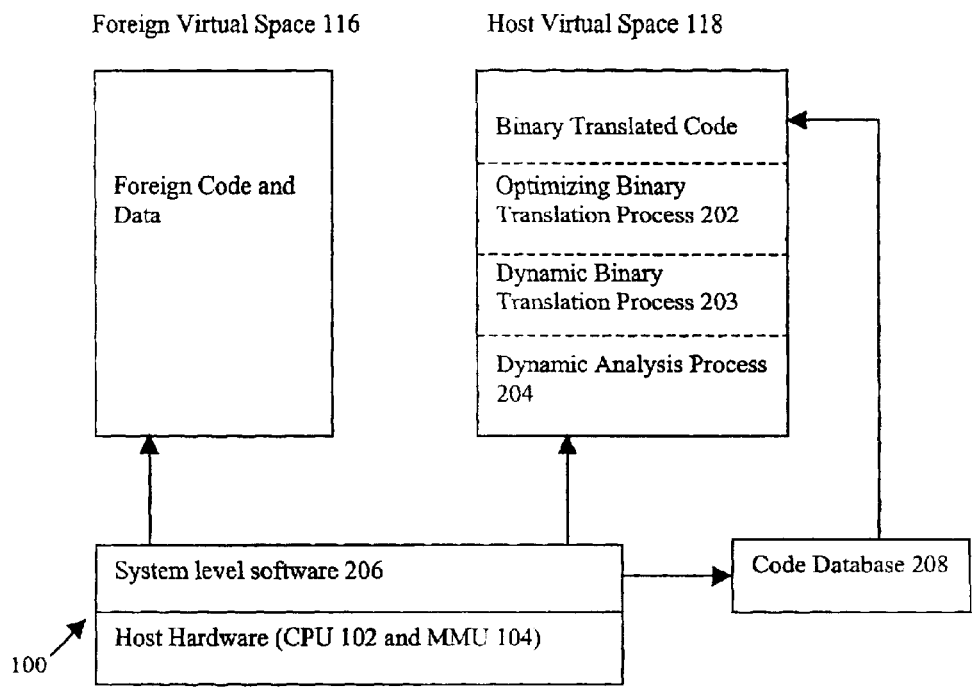
FIG. 2 illustrates a more detailed representation of the host computer system illustrated in FIG. 1.

Referring now to FIG. 2 shows a preferred block diagram of computer system 100 adapted to executing foreign operating system and application code. Computer system 100 comprises host CPU 102 and MMU 104 together with hardware support for efficient and reliable execution of translated binary code. Through a software layer 206, CPU 102 operates to execute foreign code on the host system. Software layer 206 functions as a minimal operating system for host computer system 100 when executing foreign code. Software layer 206 further includes the database management code. The process of decoding and semantic substitution is fulfilled in binary translator software. Foreign code is transferred from disk drive 106 and maintained in foreign virtual space 116 while the host processes are maintained in host virtual space 118. After semantic substitution for foreign operations in terms of host operations, the intermediate representation is processed by an optimizing binary translation process 202 to improve performance. More specifically, software layer 206 functions as a basic operating system for the host platform. Its primary function is to interface the binary translation system with hardware-specific features of the host platform. So as to minimize the size of software layer 206, many features, which are inherent to an operating system, have been omitted. For example, the host platform software layer 206 does not include support for a file system, process management or virtual memory management.

The software layer 206 functions in conjunction with hardware support features to achieve correct execution of binary translated foreign code. The hardware support features include a register that points to a bit string maintained in host virtual memory. Every bit in the bit string corresponds to a 4K page of memory. As will be appreciated by one familiar with the x86 platform, the x86's "physical memory" is divided onto 4K pieces. When other platforms are emulated, the page size will be different. It will be further appreciated that the length of the bit string is equal to the size of x86 memory. If a bit is set, the corresponding physical memory is locked and write access will be denied. Thus, any attempt to modify a locked memory location will cause a hardware exception. This hardware register tracks all modification to the foreign code and thus maintains correspondence between foreign and binary translated code. The register is maintained on the host, because if the protection bit were added to the foreign page table, it would violate the contents of the foreign memory. In this manner, a foreign operating system and foreign applications written for the foreign operating system (e.g., x86 software) can be executed on the host computer.

The present invention provides a computer that is a virtual x86 computer where a user can install any x86 software. The host operating system is not a full operating system because it uses the features of the foreign operating system. The host operating system is simply tasked with servicing hardware and software exceptions specific to the host system and interfacing to the system hardware for the binary translation system. As will be appreciated, the present invention comprises a "software layer" plus a "binary translation system" plus the "platform" results in a "virtual microprocessor" adapted to execute foreign operating system and application code.

After the binary translation process, the binary translated image of the foreign code will be available for execution by the host processor. All foreign data remains in the foreign virtual space. Moreover, there could be constants in the original foreign code, which the binary translated code might have read. One solution would be to analyze the foreign code to find all memory accesses and put all data and constants into the host virtual memory. However, this analysis would have to correct all address constants in the code and insert special checks for load and store operations etc. Accordingly, it is desirable to maintain the data and constants in the foreign virtual space. Thus, as the translated binary code executes, the behavior of the foreign virtual space looks as if it is being updated in real-time just as if it were executing on the foreign platform.

Foreign code execution on computer system 100 begins with transferring foreign code from disk drive 106 to foreign virtual space 116. After binary translation of the foreign code, all the binary translated pages in the foreign virtual space are write-protected so any subsequent write accesses will cause an exception. This protection mechanism maintains coherence between the foreign code and the translated binary code. Computer system 100 also includes a dynamic binary translation process 203 and a dynamic analysis process 204. Dynamic binary translator 203 is used as a fast interpreter of a foreign code for two purposes. First, it enables immediate execution of the foreign code even if there is no pre-existing translated binary code in database 208 and to prepare information for the optimizing binary translator. Second, dynamic binary translator 203 is used in any recovery process for precise interrupt maintenance.

Dynamic analysis process 204 functions like a monitor in the binary translation system. Dynamic analysis process 204 helps not only to control execution of translated binary code, but also to process all exceptions properly, and to invoke optimizing binary translator and provide it with profile information. Dynamic analysis process 204 also includes memory management functions relating to maintaining translated binary code compaction in memory and support coherence with the foreign code. Dynamic analysis process 204 is also responsible for processing special situations during execution of the translated binary code that were not discovered during binary translation. For example, self-modifying code, newly created code and exceptions are all situations that may not be discovered at binary translation time. All new information collected by the dynamic analysis process 204 is saved for further utilization by the optimizing binary translation process 202.

Dynamic binary translation process 203 and optimizing binary translation process 202 work simultaneously. As binary translator 202 translates foreign code in optimized mode, dynamic binary translator 203 translates the code in fast and simple mode. When optimized translated binary code is ready, the control switches over to the optimized code at a coherent point for execution. The dynamic binary translator 203 is also used by dynamic analysis 204 to respond to any discovered special situations. Scheduling instruction execution is a function of binary translator 203.

In accordance with the present invention, a method for executing translated binary code is provided. As noted above, foreign code is stored on disk drive 106 until it is transferred to memory 118. Typically, an entire sector of the code is transferred to memory 118 in a single operation.

During the transfer process, the method of the present invention uses low-level code correspondence checking during the runtime binary translation process where a sequence of low-level code, as will be understood in the art, is a sequence of basic machine operations.

Each sequence must be translated using optimizing binary translation process 202, dynamic binary translation process 203 and dynamic analysis process 204 in order to obtain optimal performance on host computer system 100. Where there is constant swapping of code in foreign virtual space 118, performance can degrade while processes 202–204 translate the code. Further, in some instances, processes 202–204 could be repetitively translating a limited number of code segments resulting in an inefficient utilization of host computer 100 resources.

To improve performance, code database 208 functions in conjunction with software 206 to minimize the necessity to translate code each time a swap occurs. As each sequence of binary operations is transferred to memory 116, corresponding translated code is transferred to host memory 118 for execution by the host computer 102 while bypassing processes 202–204. Thus, rather than translating the sequence each and every time foreign code is swapped into foreign virtual space 116, the corresponding host code stored in code database 208 is accessed on an as-needed basis and moved directly to active system memory of the host computer. With the corresponding host code in memory, processes 202–204 need not perform their translation functions thereby improving the utilization of system resources.

In operation, when a foreign application program is selected, computer system 100 must load code into system memory. Accordingly, as a first step, a sequence of foreign code is acquired from disk drive and transferred to foreign virtual space 116. During the transfer operation, software 206 determines if corresponding translated binary code is already available in database 208. If software 206 locates corresponding translated binary code in database 208, that code is transferred to memory 118. If the database 208 does not contain corresponding code, then the method of the present invention provides for generating translated binary code by invoking processes 202–204. As soon as the binary host code is present in memory 118, execution units 106 may execute the code.

The problem of fast execution of translated binary code can be further improved by optimizing the compiler but this approach requires substantial understanding of both the foreign and host platforms. Accordingly, the present invention teaches a method for setting the correlation between a foreign code and the correspondent translated binary code to exclude repetitive translation of the same code.

Figure 3:
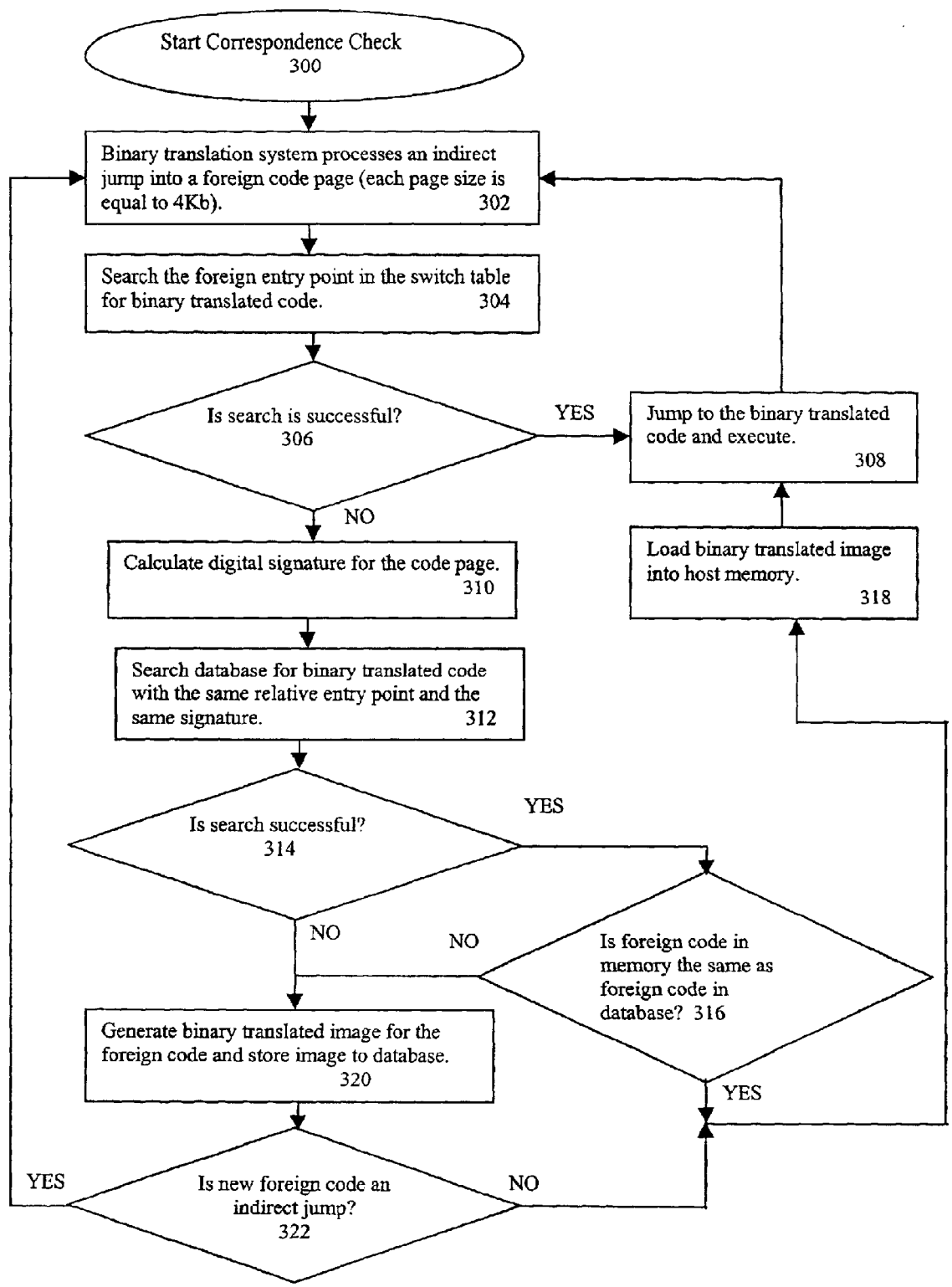
FIG. 3 is a flow diagram illustrating a correspondence checking algorithm.

A method for determining correspondence between the memory content of the host and foreign virtual spaces is illustrated in the flow diagram of FIG. 3. This method is initiated by computer system 100 when self-extracted codes (i.e. code that is located in packed format on hard disk and which is unpacked after being loaded into the memory). The method may also be initiated when the binary translation system tries to jump into a foreign code page in memory where the corresponding translated binary code is not yet in memory. At step 302 software layer 206 obtains the entry point address and hence the relative entry point to the foreign code page. Then as indicated at step 304, a search is conducted for the foreign entry point in a switch table. The switch table contains pairs of addresses in memory: foreign address in the foreign memory and a corresponding address in the host memory for binary translated code. If search is successful (step 306), software layer 206 jumps to the binary translated code in host virtual space and begins to execute as indicated at step 308.

If the search in step 306 is not successful, software layer 206 calculates a digital signature for foreign code page as indicated at step 310. The digital signature uniquely identifies the binary translated code and may be either a disk sector address or may be calculated using a hashing algorithm. Using the digital signature, software layer 206 searches the database for binary translated code with the same relative entry point and the same signature as indicated at step 312.

If the database search is successful (step 314), software layer 206 then compares at least a portion of the foreign code sequence in memory (foreign virtual space) with a portion of the foreign code stored in database (step 316). The verification step 316 is facilitated, in one preferred embodiment, where database 208 includes at least a portion of the foreign code sequence associated with the binary translated code. Both the foreign code sequence and the binary translated code are stored in the database. Thereafter, software layer 206 loads the binary translated code into host memory as indicated at step 318 and control is transferred to the newly loaded code as indicated at step 308.

If, however, the search at step 314 is not successful, software layer 206 generates a binary translation image as indicated at step 320. The translation process invokes the binary translator processes to generate the binary translated image for storage to the database. As a final check at step 322, software layer 206 verifies that the foreign code does not include an indirect jump. If an indirect jump is detected, the process flow proceeds back to step 302. If an indirect jump is not detected, the process flow proceeds to steps 318 and 308.

The algorithm illustrated in FIG. 3 recognizes self-extracted codes (i.e. codes that are located in packed format on hard disk and which unpack themselves after they have been loaded into the memory) by use of a hashing algorithm. In an alternative embodiment, the storage location of the foreign code on disk is used to uniquely identify the code. Instead of calculating the digital signature (step 310) using the hashing algorithm, software layer 206 checks for correspondence between a sequence of foreign code in foreign memory and the same foreign code on the hard disk. Then, software layer 206 checks for correspondence between the foreign code in the foreign memory and its binary translation image in the host memory. In this manner, software layer 206 ensures correspondence between the foreign code on the hard disk and the binary translated image but software layer 206 must trace all transfer of foreign code from the hard disk and all changes of code on the hard disk. Further, this approach does not recognize self-extracted codes so it is possible to suffer some performance penalties with this alternative embodiment.

Figure 4:
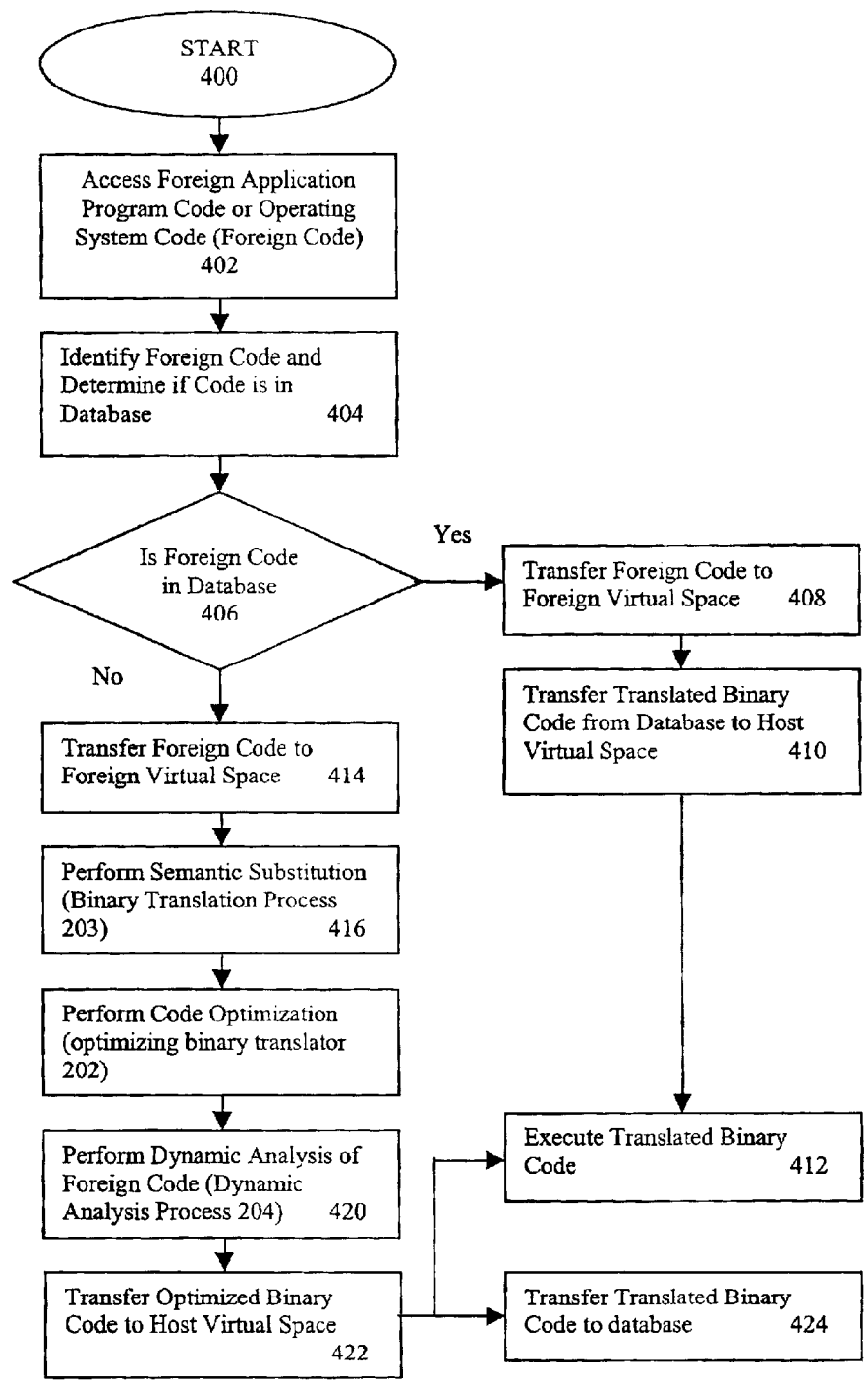
FIG. 4 illustrates a flow diagram for using a database cache for minimizing the need to translate foreign code at run-time.

Referring now to FIG. 4, another preferred flow process in accordance with the present invention is illustrated. Specifically, when a foreign application program or operating system is executed, foreign code must be loaded into system memory. Accordingly, as a first step, step 402, a sequence of foreign code is acquired from the disk drive or other storage media under control of software layer 206. A sequence is preferably a page of memory (4 k bytes) although one skilled in the art will understand that a sequence could be either more or less depending on engineering considerations and the foreign platform.

During the transfer, software 206 in step 404 identifies the code sequence such as by calculating a hashing function or determining the disk location where the code is stored. In addition, software 206 may further compare the code sequence to a foreign code sequence stored in the database together with the binary translated code where the foreign code sequence in the database is the code (or a portion of the code) that was previously translated. Once the code sequence is identified, software layer 206 then determines, as indicated at step 406, if translated binary code that corresponds to the sequence of foreign code is available in database 208.

If software 206 locates the corresponding translated binary code in the database, the foreign code is transferred, as indicated at step 408, to the portion of reserved system memory referred to as foreign virtual space 116 (see FIG. 2). Then, software 206 proceeds with the transfer of translated binary code from the database to system memory referred to as host virtual space 118 (see FIG. 2) as indicated at step 410. If the database is resident on a separate physical storage device, the transfer to host virtual space may proceed substantially in parallel with the transfer of the foreign code. Once translated binary code is in memory, host computer system 100 may begin execution of the code as indicated at 412.

If, however, software 206 is unable to identify translated binary code that corresponds to the sequence of foreign code, the method of the present invention proceeds from step 406 to step 414 where foreign code is transferred to foreign virtual space. Once the code is transferred, the method of the present invention then proceeds to compile the sequence of foreign code to obtain the translated binary code. This translation process is indicated at steps 416 through 422. More specifically, as indicated at step 416, binary translating process 202 performs a semantic substitution for foreign operations in terms of host operations to generate an intermediate representation.

The intermediate representation is then processed by an optimizing binary translation process 202 to improve performance as indicated at step 418. Then, dynamic analysis process 204 is responsible for processing special situations that were not discovered during binary translation. Information collected by the dynamic analysis process 204 may be used by binary translation process 202.

Upon completion of process steps 416–420, the translated binary code is transferred to system memory as indicated at step 422. Software 206 may selectively store the translated binary code to corresponding to the foreign code to database 208 as indicated at step 424 before transferring control to step 412. When this sequence of foreign code is subsequently accessed from the storage device, software 206 will detect that corresponding code is available and it will be loaded directly from the database 208. Obtaining code from database 208 is more efficient than invoking process steps 416 to 424.

As noted above, software 206 maintains correspondence between the selected foreign code and translated binary code located in database 208 by using either a disk indexing technique or a hash. Once code is requested, software 206 loads the selected sequence of translated binary code from the database module into system memory. It will be appreciated that if database 208 is stored on a second storage device, such as a second disk drive (not shown), the transfer of translated binary code from the second disk drive may proceed in parallel with the transfer of the foreign code from storage device 106. In this manner the transfer of translated binary code may be initiated with only the minimal delay necessary to determine the location of the corresponding code in the database.

Alternatively, when foreign code is being loaded from disk, the disk sector where the code is stored is detected by software 206. Using the disk sector as an "address" or index into the database, software 206 will check the database for a block of translated binary code at the address. In this embodiment, the translated binary code is maintained in database 208 as an ordered list. If the check of the database by software 206 finds valid code, the correspondent translated binary code is loaded into the memory and executed. Whenever a write is detected to a disk sector, that "address" is marked in database 208 as invalid because the foreign code will have been changed on storage device 106. Accordingly, the corresponding translated binary code is excluded from the database and it must be recompiled before being executed.

When the translated binary code in the database exceeds the available space available for storage, selected code can be removed based on usage monitoring or on age of the code since it was last accessed. Software 206 is responsible for grooming the database to minimize the size and access times.

Another method of recognizing the foreign code uses hash coding for determining an associative location in database 208. More specifically, a hashing function takes a portion of the foreign code sequence to generate an address in database 208. In one embodiment, the hashing function uses each foreign instruction to identify the location in database 208 where corresponding translated binary code is stored. While this granularity ensures the most flexibility, it is preferred that at least each page of memory be accessed as a module so as to minimize the possibility that the hash result will not be unique. One preferred hashing algorithm is the MD5 algorithm such as disclosed in Rivest, R., Network Working Group, Request for Comments: 1321; MIT Laboratory for Computer Science and RSA Data Security, Inc., April 1992, which is incorporated herein by reference for all purposes. The MD5 algorithm is a public domain message-digest algorithm that takes as input a message of arbitrary length and produces as output a 128-bit "fingerprint" or "message digest" of the input. The MD5 algorithm is sophisticated enough that it is computationally infeasible to produce two messages having the same message digest, or to produce any message having a given pre-specified target message digest. The MD5 algorithm is intended for generating unique digital signature applications but is used in this embodiment as the hashing algorithm to generate the index into the database. Other, faster hashing routines faster may be used where the amount of code stored in database 208 does not justify use of the MD5 algorithm.

When hash coding is used for foreign code recognition, it may be useful to calculate only a portion of the entry point into the database code where the length of the code used to by the hash function is equal to physical page size of the foreign architecture. If the hash results in a unique database location, then foreign code recognition may be expanded using an additional length of foreign code thus permitting deeper optimization in selecting code segments from the database. In any event, the database will typically contain translated binary code (host code) and a corresponding hash value for the foreign code. The database may also contain a portion of the foreign code to facilitate identification of the foreign code sequence. For example, a beginning and ending portion of the code could be retained in the database for future reference. The database may also include relocation information that can be used when transferring code from the disk to host virtual space. The relocation information is associated with the translated binary code although it may be retained in a different database structure. The database may also include additional information that facilitates verification that specific code was translated by the optimizing compiler and an address switch table for identifying entry points for the translated binary code. The database may be a relational database or two, flat, linked databases one of which contains the hash table and additional information for necessary for code recognition and an index into the second base. The second database contains only optimized binary translated images with additional information for the loader.

The database can be located at the same hard disk (part of the disk) which is used by foreign operating system (more precisely, by its translated binary version). But in this case all accesses to the hard disk must be monitored by software 206 so that the database remains invisible to the foreign operating system. To prevent corruption of the database, software 206 must intercept each disk access generated by the foreign operating system to prevent unauthorized writes to the database.

Figure 5:
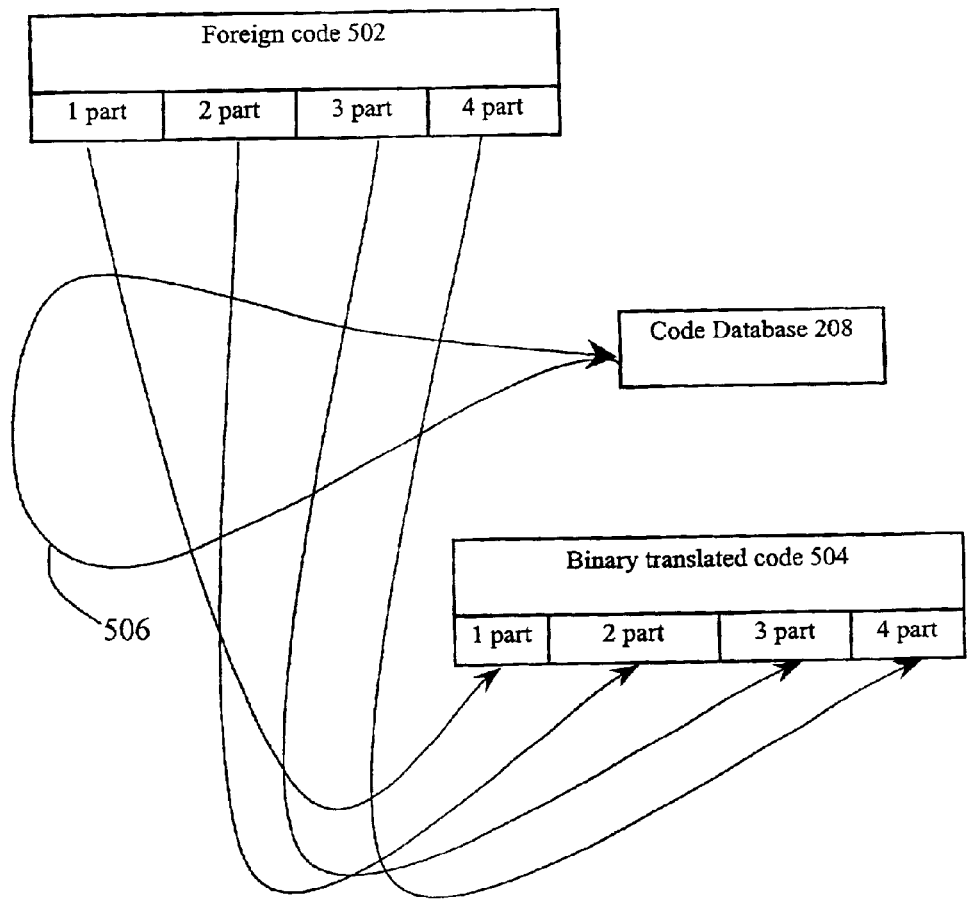
FIG. 5 conceptually illustrates one preferred database approach for reusing translated binary code.

Referring now to FIG. 5, the present invention is conceptually illustrated. When there is a control transfer to a sequence of foreign code as indicated at 502, the present invention determines whether the address has already been processed and whether the translated binary version 504 is already located in the host memory. Each sequence of foreign code 502 includes a plurality of operations or instructions such as indicated by parts 1–4. The determination is carried out by the software layer, which is indicated at 506. If the translated binary version 504 is in memory, computer system 100 can execute translated binary code where corresponding operations are indicated by parts 1–4. If the foreign code is absent from memory, the present invention calculates the hash value for the foreign code and transfers control to the database management portion of software 206. After the hash value and entry point address into the database is determined, the database management subsystem tries to determine if corresponding translated binary code exists in the code database. If the code is found, more precise checking is not required and the translated binary code is loaded into the host memory. If there is no code in the database, the foreign code is translated by the binary translation process and placed, first, into the host memory. After it is optimized, it is placed into the database.

If the translated binary code was constructed for a wider range of foreign code than is present in the foreign virtual space, the translated binary code is still useable. For example, if one page of foreign code were swapped out of memory, there would be a hole that would have to be filled with new foreign code. But since the translated binary code is still available in memory, the binary code may be nevertheless used after a check of correspondence part of foreign code command. By way of illustration, the translated binary code in host virtual space 118 is still executable if the corresponding sequence of foreign code (call it a region) occupies only one page in memory. If, however, a region occupies two or more pages in memory and translated binary code for this region already exists, it is still executable. However, if at some point in time during operation the foreign operating system (that is, the translated binary operating system) swaps one of the pages containing a part of the region out of memory, there is no longer correspondence between the host virtual space 118 and foreign virtual space 116. In this event, the translated binary copy of the region would be incorrect, because in foreign system there will be trap when any instruction tries to access the swapped page. Accordingly, the present invention inserts into the translated binary code a "check operations" on page boundaries to guarantee the same behavior as in foreign system.

Accordingly, in summary, the present invention provides, in one embodiment, a method for binary translation implemented on a computer system. The method comprises the steps of storing host code to a database; loading at least a portion of the host code from the database into the computer; controlling the correspondence between a current foreign code and database code; controlling the correspondence between the foreign code and creation of newly translated code for storage in the database for future reference; and compiling the foreign code to the host code if no corresponding code is available in the database. In another embodiment of the present invention, the efficiency of the binary translation process is improved by correlating previously translated binary host code to foreign code. This approach eliminates the repetitive process of translating the same foreign code more than once. During runtime execution, a software layer intercepts foreign code to check for correspondence between the foreign code and previously translated binary code. If correspondence is found, a set of translated binary code corresponding to the foreign code is transferred to the computer processor for execution. To minimize the translation process, translated binary code is stored on the hard disk or other memory storage device. Once correspondence is determined, the code is moved from the database to system memory. This embodiment provides a method for binary translation implemented on a computer system comprising the steps of storing host code to a database; loading at least a portion of the host code from the database module into the computer; controlling the correspondence between a current foreign code and database-located host code module; controlling the correspondence between the foreign code and creation of an absence module; and compiling the foreign code to the host code module.

The above-described embodiments achieve substantial improvement in executing foreign code on a host system. Although the improvement will vary depending on the foreign code (i.e., x86 versus Sun Sparc), how often code is accessed (i.e., hot spots in the foreign code) and the amount of the code in these hot spots, improvement can be on the order of two times the results achieved from run time dynamic binary translation execution without the database support.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

What is claimed is:

1. A method for improving execution performance of foreign binary code on a native computer system, the method comprising:

managing an association between the foreign binary code and a translated code, wherein the translated code is stored in either a volatile memory or a non-volatile memory, identifying a portion of the translated code that is associated with a corresponding portion of the foreign binary code from either the volatile memory or the non-volatile memory;

if the identified portion of the translated code is stored in the non-volatile memory, transferring the identified portion of the translated code from the non-volatile memory to the volatile memory without significant modifications;

performing a set of optimizing transformations on a portion of the translated code stored in the volatile memory to generate a transformed portion of the translated code, wherein the transformed portion includes improved execution performance characteristics; and storing the transformed portion in the non-volatile memory.

2. A binary translation system for use with a native computer system to provide software compatibility with a foreign computer system, the binary translation system comprising:

dynamic binary translator software comprising:
a plurality of binary translators, each binary translator configured to optimize a translated binary code at a designated optimization level; and
a plurality of dynamic support routines for use by the plurality of binary translators;

a code cache configured to store a most recently used portion of a translated binary code, wherein the translated binary code corresponds to a foreign binary code compiled for use with the foreign computer system, and wherein the code cache is implemented using a portion of a volatile memory of the native computer system, the code cache being available only to the binary translation system and the translated binary code;

first set of logic configured to retrieve contents from the code cache in response to corresponding foreign code branch events;

a non-volatile database configured to store optimized portions of the translated binary code; and second set of logic configured to retrieve contents from the non-volatile database in response to corresponding portions of the foreign binary code being discovered in the volatile memory of the native computer system and transfer retrieved contents to the code cache.

3. The binary translation system of claim 2, wherein the non-volatile database is concealed from the foreign binary code by means of a separate external storage device attached to a peripheral channel of the native computer system.

4. The binary translation system of claim 2, wherein the non-volatile database is concealed from the foreign binary code by means of a peripheral access filtering mechanism;

wherein accesses from the foreign binary code to a storage device storing the non-volatile database are analyzed by the binary translation system;

wherein accesses are allowed if such accesses target the foreign binary code and any accompanying data sets;

wherein accesses are disallowed if such accesses target storage space occupied by the non-volatile database; and wherein overall capacity and related parameters of the storage device communicated to the foreign binary code are corrected to account for resulting loss of usable space on the storage device.

5. The binary translation system of claim 2, wherein the second set of logic is further configured to:

intercept a foreign code-initiated external storage access operation by the binary translation system;

maintain an association structure, filled to provide associations between a computer system memory address group and an external storage address group, the external storage address group expressed in terms of logical blocks or any other suitable entities;

for any storage-to-memory read operations, update the association structure to note which memory addresses get loaded from which logical blocks, wherein the loaded memory addresses are subsequently monitored against future modification attempts by the foreign binary code;

for any memory-to-storage write operations, update the association structure to note which memory addresses get stored to which logical blocks, wherein the memory addresses are subsequently monitored against future modification attempts by the foreign binary code, and search the non-volatile database for optimized translated binary code sequences associated with now overwritten logical blocks and invalidate any such sequences;

for any modification attempt on the monitored memory addresses, perform the invalidation of the corresponding association;

for optimized translated binary code sequences saved into the non-volatile database, save the associations between the foreign binary code address groups and the corresponding logical blocks, thereby associating the optimized translated binary code sequences with a group of logical blocks;

if a need to search for an optimized translated binary code for a group of foreign binary code memory addresses arises, check an association table to find which logical blocks supplied the foreign binary code that is now available at the corresponding foreign binary code memory addresses;

if an association is discovered in the association table, search the non-volatile database to locate the optimized translated binary code sequences associated with the association table-reported logical blocks numbers; and if a sequence is successfully discovered in the database, load the corresponding optimized translated binary code from the database into the code cache and attach the loaded code to address mapping facilities, thereby directing all future execution of the foreign binary code at the specified foreign address to the optimized translated binary code.

6. The binary translation system of claim 5, further comprising a third set of logic configured to retrieve contents from the non-volatile database if the second set of logic becomes unable to maintain a reliable association structure for one or more storage devices in the binary translation system or fail to locate suitable optimized translated binary codes.

7. The binary translation system of claim 2, wherein the second set of logic is further configured to:
- for each optimized translated binary code sequences saved into the non-volatile database, save an image of the source foreign binary code into the non-volatile database;
- associate each optimized translated binary code sequence with the corresponding foreign code images;
- if a need to search for an optimized translated binary code for a group of foreign code memory addresses arises search the database for the foreign code image identical to the actual contents of the memory at the memory addresses;
- if an image is successfully located in the database, load the corresponding optimized translate binary code from the database into the code cache and attach the loaded code to address mapping facilities, thereby directing all future execution of the code at the specified foreign address to the optimized translated binary code.

8. The binary translation system of claim 7, wherein the second set of logic is further configured to:
- calculate a set of uniform identification values for every foreign code image being stored to the database, said set of values calculated in such a way as to provide a digest of contents of the image with a relatively low collision rate, said digests being smaller, faster and easier to effectively compare than the foreign code images;
- associate the digests with the foreign code images;
- if a need to search for an optimized translated binary code for a group of foreign code memory addresses arises calculate the digest for the actual contents of the memory at the memory addresses;
- compare the calculated digest against all the digests for the images stored in the database to identify a set of images whose contents produce the same digest;
- for each image in the identified set of images, order a complete image comparison to find an image identical to the actual contents of the memory at the memory addresses; and
- if an image is successfully discovered in the database, load the corresponding optimized translated binary code from the database into the code cache and attach the loaded code address mapping facilities, thereby directing all future execution of the code at the specified foreign address to the optimized translated binary code.

* * * * *